Oct. 31, 1950  R. COLLINS  2,528,339
CRUISER'S COMPASS
Filed Nov. 23, 1945  2 Sheets-Sheet 1
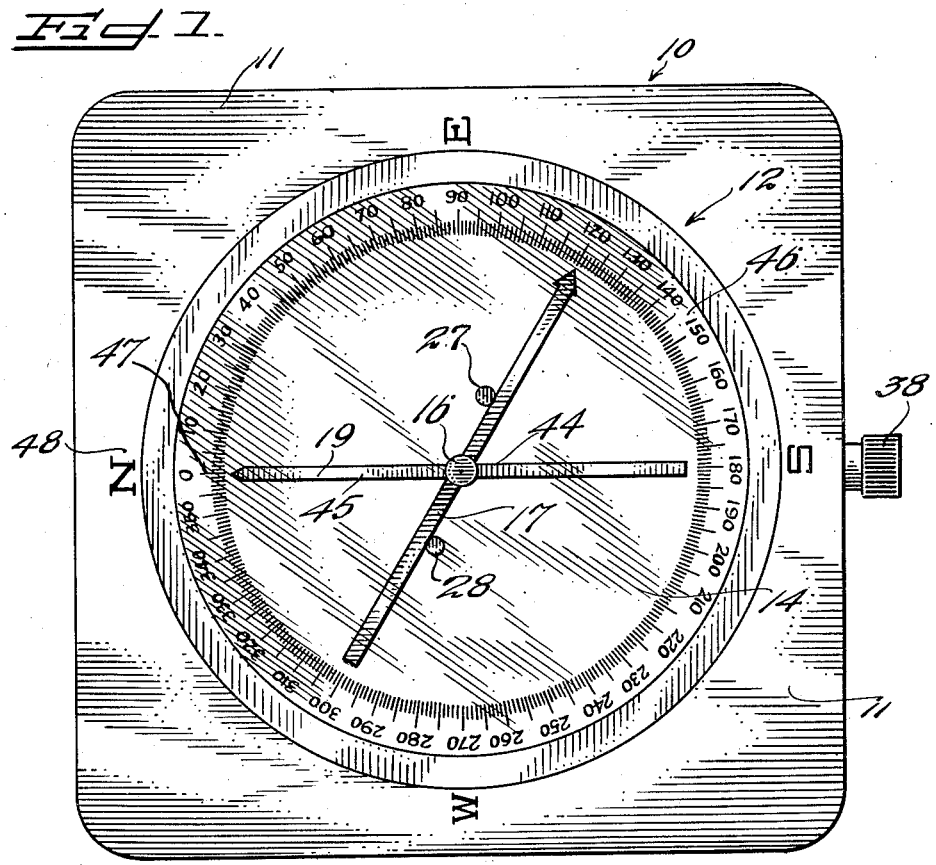
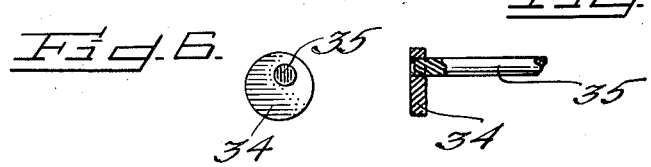
Inventor
REGINALD COLLINS,
By *Clarence A. O'Brien
and Harvey B. Jacobson*
Attorneys Oct. 31, 1950 R. COLLINS 2,528,339
CRUISER'S COMPASS
Filed Nov. 23, 1945 2 Sheets-Sheet 2
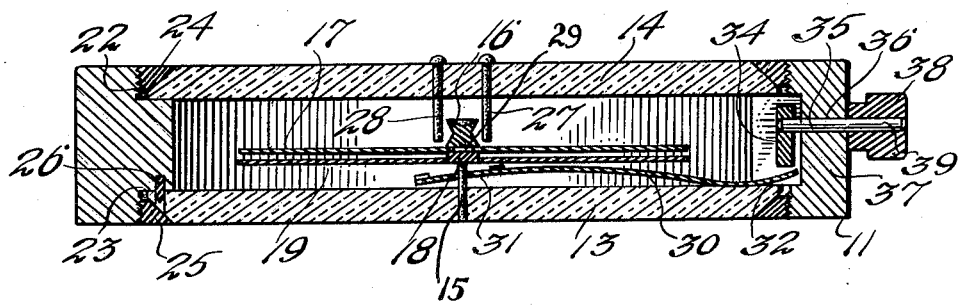
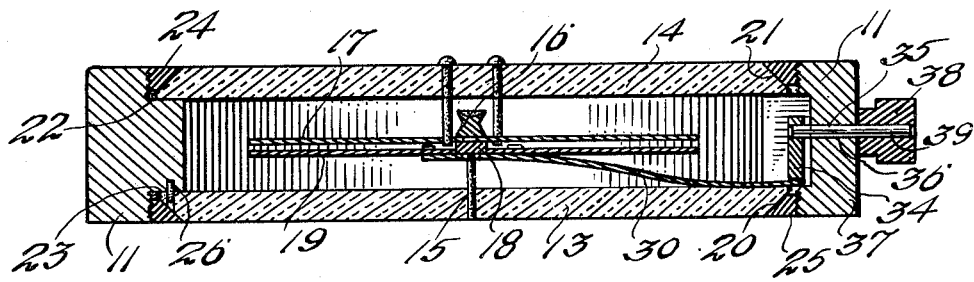
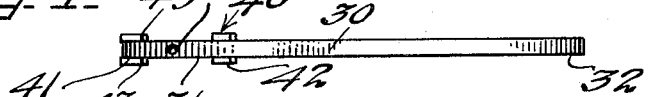
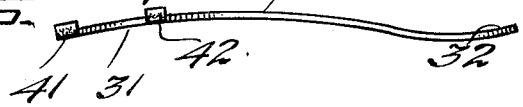
Inventor
REGINALD COLLINS,
By Clarence A. O'Brien
and Harvey B. Jacobson
Attorneys Patented Oct. 31, 1950

2,528,339

UNITED STATES PATENT OFFICE 2,528,339

CRUISER'S COMPASS

Reginald Collins, Harrisville, N. Y.

Application November 23, 1945, Serial No. 630,295

1 Claim. (Cl. 33—222)

My invention as described herein, and illustrated in the accompanying drawings, consists of a combined compass and protractor, an object of which is to provide means for laying out line of degree to objective.

Another object of my invention is to provide a compass with a magnetic needle and a non-magnetic needle.

A further object of this invention is to provide in a compass, a 360° protractor, the zero of the protractor and the N. of the compass being at one and the same point.

A primary object of my invention is the provision of means in a compass for pointing out an objective regardless of the position of the compass.

Another object of my invention is to provide in a compass a non-magnetic direction indicating needle and means for locking the same in position pointing to the exact angle to be followed relative to zero of the compass.

Other features and advantages will become more readily apparent from the following description and the accompanying illustrative drawings in which:

Figure 1 is an elevational view of my combined compass and protractor,

Figure 2 is a transverse sectional view thereof,

Figure 3 is a similar view showing parts in changed position,

Figure 4 is a detail plan view of a lock member,

Figure 5 is a side elevational view thereof, and

Figures 6 and 7 are details of a lock actuating means.

In the accompanying drawings, and in the following specification, the same reference characters are used to designate the same parts and elements throughout and in which 10, refers to my invention in its entirety and 11, indicates a square case which is made square purposely for aligning with north and south meridian line as laid off on a map. Inset in the square block is a compass 12, comprising top and bottom clear glass or plastic walls or crystals 13 and 14, and secured in the center of the former is a post 15, terminating at its upper end in a needle point (not shown) and upon which point seats a jewel mounted hub 16, to which is attached a non-magnetic needle 17. Directly below said needle is connected to the hub, adhesively or in any other suitable manner, a friction ring 18, which carries the magnetic needle 19.

The crystals 13 and 14, are both provided with beveled peripheral edges 20 and 21, which seat in rabbeted recesses 22 and 23, respectively in the case block 11, said recesses being internally screw-threaded to receive the bezeled threaded retaining rings 24 and 25. The crystal 13 is held fixed in its seat by a pin 26; however the crystal 14 is rotatably seated in its recess in order that the inwardly projecting pins 27 and 28, carried by said crystal 14, may move the non-magnetic needle 17, when desired. The said pins 27 and 28, are positioned so that they may project one on each side of the needle 17, and on opposite sides of its axis of rotation.

The hub 16, and with it the ring 18, and obviously both needles, are vertically movable upon post 15, in order to be normally seated by gravity upon the point of the post, but which may be raised above said point by means of a lock member 30, being somewhat sinuous with a flat end 31, and a raised end 32. The end 31, of said lock member is provided with an aperture 33, through which post 15 projects and forms a guide upon which end 31 may move vertically to lift the needle assembly when the terminal 32, is forced down by the cam 34, to which shaft 35 is eccentrically attached. Said shaft 35 operates through a bore 36 in the side wall 37, and has a knob 38, fixed to its outer end 39, whereby the said cam 34 may be operated. On each side of bore 33 of the lock arm 30 are a pair of spaced U-members 40 and 41, the arms 42 and 43 of each of which are adapted to engage the opposite edges 44 and 45 of the needle 19, the purpose of which will appear presently.

The crystal 13, is provided with a marginal protractor 46, reading from zero to 360°, the zero 47 of which is the north point of the compass as indicated at 48.

In order to follow a course to an objective the case is centered upon a map at the starting point (which can be readily located through the two clear lenses) the zero mark at the top of the map and aligned with the north and south line. Then with a straight edge on a line from the center of the compass to the objective point, the degree which must be followed will be shown. Now turn knob 38, to lock the compass needle 19, at zero. Now the needle 17 is turned to the degree you must travel, plus or minus the number of degrees of magnetic deviation from true north (which deviation is usually indicated on the map) of the section which you are covering) then release the magnetic needle 19 and thereafter the needle 17 will at all times point to the course to be followed to the objective.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A compass having a case which is square in horizontal cross-section, transparent top and bottom crystals in said case, a protractor incorporated with the bottom crystal and having a zero marking on a normal bisector of one of the sides of the casing, a magnetic needle and a non-magnetic needle carried by said magnetic needle, both needles being coaxially mounted in said casing, means to shift said non-magnetic needle relative to said magnetic needle, said means comprising means for rotatably mounting said top crystal on the casing, pins carried by said top crystal and depending into the casing, means for locking said magnetic needle at zero position while said non-magnetic needle is shifted relative to said magnetic needle, said locking means being adapted to lift said non-magnetic needle into engagement with said pins and comprising a lock member of curved lever character, and an eccentric mounted on the casing and adapted for manual control to tilt said lock member into a position engaging said magnetic needle, said needles being supported on a pivot pin, and said lock member having one end slidably mounted on said pin and having U-members engageable with the underside of said magnetic needle.

REGINALD COLLINS.

REFERENCES CITED

The following references are of record in the file of this patent:

UNITED STATES PATENTS

| Number | Name | Date |
|---|---|---|
| 1,297,612 | Valcauda | Mar. 18, 1919 |
| 2,108,263 | Lund | Feb. 15, 1938 |
| 2,136,970 | Ekeberg | Nov. 15, 1938 |

FOREIGN PATENTS

| Number | Country | Date |
|---|---|---|
| 107,029 | France | Mar. 3, 1875 |
| 31,187 | Sweden | July 22, 1911 |
| 445,312 | Great Britain | Apr. 7, 1936 |